Patented June 20, 1933

1,914,458

UNITED STATES PATENT OFFICE

JOHN H. PERRY, OF WILMINGTON, DELAWARE, ASSIGNOR TO E. I. DU PONT DE NEMOURS & COMPANY, OF WILMINGTON, DELAWARE, A CORPORATION OF DELAWARE

PROMOTION OF CATALYSTS

No Drawing. Application filed September 13, 1929. Serial No. 392,489.

This invention relates to catalytic processes. More specifically it relates to means of increasing the efficiency of catalytic reactions. Still more specifically it relates to means of improving catalysts. Still more specifically it relates to means for promoting a catalyst.

In the science of catalysis three terms are well known. The first of these, "catalysts," refers to materials which, while taking no part themselves in a given reaction, yet increase the efficiency of that reaction to a marked degree. The second of these terms is "promoter" which refers to substances which hitherto have been added to the catalytic agent itself, and which, while themselves taking little or no part in the reaction and while being themselves not catalysts for the reaction, yet cause the catalyst to function with increased efficiency. The third of these terms is "support" or "carrier" which refers to substances which are neither catalysts nor promoters, but are mere physical substances upon which the catalyst or the promoted catalyst is spread and which, by giving greater surface exposure of the catalyst, or otherwise, result in increased efficiency of the catalytic reaction.

It is to be understood that the above definitions and explanations are given realizing that little is known of the reasons for catalysis and that the catalytic chemist is compelled to be contented with knowledge of facts and such theories as appear at the moment to best explain a given phenomenon.

This invention has as an object a means of improving catalysts. A further object is a means for improving the efficiency of catalytic reactions. A still further object is the development of an entirely new and heretofore undiscovered method of increasing the efficiency of catalytic reactions and of improving the durability and poison-resisting qualities of catalysts.

These objects are accomplished by the following invention which consists in promoting, not the catalyst, but the catalyst support.

As has been pointed out the prior art shows means whereby by mixing a given substance with a catalyst an improved result is obtained. I have discovered, however, that it is not necessary to add a promoter to a catalyst to obtain an improved result, but that greatly improved results can be obtained by adding to the support upon which the catalyst is to be mounted substances which in themselves are not catalysts, which in themselves are not supports, and, finally, which in themselves are not promoters for the catalyst. Substances of this character which are added to the support or carrier in accordance with the teachings of the present invention are materials which increase the efficiency of the support or carrier and thus increase the efficiency of the composite final catalyst. Since these substances promote the activity of the support or carrier they are termed "support promoters" or "carrier promoters."

The examples given below have been chosen because they illustrate excellently the results which are obtained by my invention, but they are not to be considered in the slightest degree limitative. The invention is not limited to these catalysts and to these supports but, being as broad as the field of catalysis itself, is susceptible of application to any catalytic process and with any catalyst and its support.

*Example*

In the contact process of making sulfuric acid, sulfur dioxide is oxidized to sulfur trioxide by means of a platinum catalyst mounted on a support such as magnesium sulphate. In this process certain compounds, particularly the compounds of alkaline metals, act as poisons for the catalyst. This catalyst, furthermore, is subject to thermal inactivation and this susceptibility to thermal inactivation increases as the catalyst and its carrier accumulate these poisons. In a short time, consequently, these catalysts must be regenerated or replaced.

These bad features of the prior art are entirely obviated by my invention which, in its specific application to this catalytic process, is practiced somewhat as follows:

A catalyst is prepared thus:

About .05 parts by weight of crystallized thorium sulphate which is the promoting material, are thoroughly mixed with 5 parts by weight of crystallized magnesium sulphate, which is the support, and the whole is melted in its water of crystallization, after which the mixture is heated practically to dryness. The dry material, or "first cake", is then ground to a fine powder and mixed with sufficient water to form a thin paste. Two parts by weight of fresh magnesium sulphate crystals are then added and the resulting mixture heated to dryness. The mass thus formed, which is known as the "second cake", is then broken up into granules and screened to the desired size. Instead of using these granules as such, it may be preferred to briquette or pellet the ground granules with or without a suitable binder or lubricant. These granules, or briquetted pellets, which contained approximately 1% of anhydrous thorium sulphate, and which may contain higher percentages, with increasing advantage, up to about 4%, constitute the promoted support, and are platinized in any well-known manner such as by spraying with a solution of platinic chloride containing a small amount of cane sugar, or other easily reduced substances, to provide for the reduction of the platinum. The granules after this treatment will contain about 0.3% platinum.

In a particular instance a converter was run first with a catalyst such as is used in the prior art and comprising platinized magnesium sulfate, and then was run with a catalyst prepared, as described above, according to my invention. The catalyst first used, that is, the catalyst with the unpromoted support gave an initial conversion of 96½% and fell off to 93½% after one day's operation; after a week fell off to 92%; after two weeks fell to 89.4% and at the end of three months decreased to 81%. This performance is characteristic of catalysts of this type. My improved catalyst when used under the same conditions pertaining to the use of the catalyst with the unpromoted support, described above, after a period of eleven months of continuous operation had shown no sign of poisoning, no sign of thermal inactivation, and was giving the same efficiency of conversion which it had given when first used in the process. This conversion was approximately 98% at the beginning (as compared with 96½% for the catalyst with the unpromoted support) and at the end of eleven months was still giving a conversion of 97–98% and had shown no signs of deterioration, whereas the catalyst prepared by former methods was inefficient at the end of three months.

It has been found that catalysts made with promoted supports give a higher initial conversion, a higher conversion at any given temperature, and will efficiently convert gases flowing at velocities which render catalysts with unpromoted supports relatively impotent.

The invention as applied to the sulfuric acid contact process is not limited to use with a platinum catalyst but may be used with any catalyst for the process.

The substance used as a promoter is not limited to thorium sulfate but may be thorium sulfate and/or cerium sulfate, barium sulfate, barium sulfate and thorium sulfate, ferric sulfate, ferric sulfate and thorium sulfate, barium sulfate and ferric sulfate, tantalum sulfate, copper sulfate, etc. The compounds referred to are non-reducing compounds, that is to say they are not embraced within the class of substances known as "reducing agents", and do not reduce platinum chloride or other platinum salts with which the carrier may be impregnated. Reduction of an impregnated platinum salt is effected by the presence of cane sugar or other agent which will liberate the platinum from its salt. The support used in this process is, of course, not limited to the one indicated above but can be any support normally used in the process, such as asbestos, kieselguhr, or other salt, or an oxide. It has been found, however, that in this sulfuric acid process a magnesium sulfate support promoted with thorium sulfate is advantageously used. It is apparent that the percentage composition of the catalyst can be varied between wide limits, which are to be determined by the chemists.

Some of the advantages of this invention are listed here.

1. Increased activation of the catalyst.
2. Increased efficiency of the reaction.
3. Longer life of the catalyst.
4. Apparent elimination of thermal inactivation.
5. Apparent elimination of poisoning.
6. Greater activity at whatever temperature used.
7. Promotion of catalyst without the necessity of mixing it with other objects.

Other advantages will be apparent from the reading of the specification and claims.

It is to be understood that the principle of support promotion is not limited to the chemical process given above as an example, is not limited to the catalyst above described, or to the platinum family of catalysts, is not limited to this support or to these support promoters, but is applicable to any support, to any support promoter, to any catalyst and to any catalytic process. The invention consequently is not to be deemed limited in scope except as by the appended claims.

This application is a continuation in part of my application Ser. No. 374,956, filed June 29, 1929, for Promoted catalysts and method of making the same.

I claim:
1. A catalyst comprising an asbestos sup- port, a catalytic substance of the platinum family deposited thereon, and ferric sulfate mixed with said support to increase the efficiency of the catalytic substance.

2. In the process of oxidizing sulfur dioxide by passing a gas mixture containing the sulfur dioxide and oxygen over a promoted catalytic composition comprising a catalytic substance, a support for said substance and a support promoter, said promoter being a substance which increases the efficiency of the catalytic substance by virtue of its presence in the support but which in itself is incapable of promoting the catalytic substance by admixture therewith.

3. A catalyst comprising a support, a promoting material mixed with said support and a catalytic substance deposited upon said promoted support, said promoting material being a substance which increases the efficiency of said catalyst by virtue of its presence in the carrier but which in itself is incapable of promoting the catalytic material by admixture therewith and being selected from the group of substances consisting of salts of barium, thorium, cerium, iron and copper.

4. A catalyst according to claim 3 in which the promoter salt is a sulfate.

5. In a process of making a catalyst, the steps of mixing a carrier with a promoter, said promoter being a substance which increases the efficiency of said catalyst by virtue of its presence in the carrier but which in itself is incapable of promoting the catalytic material by admixture therewith, and depositing a catalytic material upon said promoted carrier.

6. In a process of making a catalyst, the steps of mixing a carrier with a substance which increases the efficiency of said catalyst by virtue of its presence in said carrier but which in itself is incapable of promoting the catalytic material by admixture therewith, said promoting substance being selected from the group of substances, consisting of the salts of barium, thorium, cerium, tantalum, iron and copper, and depositing a catalytic material upon said promoted carrier.

7. The process of claim 6 in which the promoter salt is a sulfate.

8. A process of making a catalyst which comprises preparing a promoted carrier by incorporating ferric sulfate with asbestos and depositing a catalytic material of the platinum family upon said promoted carrier.

9. In a catalytic process of oxidizing sulfur dioxide the step of passing a gas mixture containing the sulfur dioxide and oxygen over a catalyst comprising a support, a promoting material mixed with said support and platinum deposited upon said support, said promoting material being selected from the group of substances consisting of the sulfates of barium, thorium, cerium, tantalum, iron and copper.

10. In a process of catalyzing a gas phase reaction the step of passing said gas phase over a catalyst comprising a catalytic substance, a support for said substance and a support promoter, said promoter being a substance which increases the efficiency of the catalytic substance by virtue of its presence in the support, but which in itself is incapable of promoting the catalytic substance by admixture therewith.

11. In a process of catalyzing a gas phase reaction the step of passing said gas phase over a catalyst comprising a support, a promoting material mixed with said support, a catalytic substance deposited upon said support, said promoting material being a substance which increases the efficiency of said catalyst by virtue of its presence in the carrier but which in itself is incapable of promoting the catalytic material by admixture therewith and being selected from the group of substances consisting of the sulphates of barium, thorium, cerium, tantalum, iron and copper.

In testimony whereof, I affix my signature.

JOHN H. PERRY.